United States Patent

[11] 3,576,534

[72] Inventor Norbert Steinberger
New York, N.Y.
[21] Appl. No. 848,781
[22] Filed Aug. 11, 1969
[45] Patented Apr. 27, 1971
[73] Assignee Compuscan, Inc.
Leonia, N.J.

[54] IMAGE CROSS CORRELATOR
10 Claims, 10 Drawing Figs.

[52] U.S. Cl. .......... 340/146.3
[51] Int. Cl. .......... G06k 9/04
[50] Field of Search .......... 340/146.3

[56] References Cited
UNITED STATES PATENTS
3,290,651 12/1966 Paufve et al. .......... 340/146.3
3,492,646 1/1970 Bene et al. .......... 340/146.3

*Primary Examiner*—Thomas A. Robinson
*Attorney*—Philip G. Hilbert

ABSTRACT: A device in which the states of the cells of the matrix of an unknown image are cross correlated with the states of the cells of the matrix of a reference image by comparing the binary values of the respective states as they are rotated in a pair of associated shift registers. The number of inequalities are accumulated for comparisons of the bit-values as they shift past different combinations of points in the shift register.

INVENTOR
NORBERT STEINBERGER
BY Philip S. Hilbert
ATTORNEY.

INVENTOR
NORBERT STEINBERGER
BY
ATTORNEY.

INVENTOR
NORBERT STEINBERGER
BY
ATTORNEY.

IMAGE CROSS CORRELATOR

BACKGROUND OF THE INVENTION

This invention pertains to pattern comparers and more particularly to pattern cross-correlators. An important one of the many uses of pattern cross-correlators is in character recognition equipment. In such equipment, an unknown character is compared with a reference character. Each character is divided into a matrix of cells wherein each cell is in one of two binary states, say white (binary zero) and black (binary one). The cells of each matrix are then compared. An error is recorded for each pair of cells where there is a lack of correspondence. The error count is called a "distance" and is a measure of the lack of correspondence. The particular reference character that causes the least "distance" is recognized as the corresponding one provided also the absolute value of the "distance" is less than a predetermined value and the next closest match has a higher "distance" value.

Now it should be realized that the unknown character is machine read from a medium, and that the machine reads a particular area of the medium to define the matrix cells. It is possible that the unknown character is misregistered with respect to the machine's reading area. Hence, even when there is an identity of unknown and reference characters, false correlation can be obtained because of misregistration.

This problem so so serious that very complicated systems have been devised to compensate for such misregistration. Thus U.S. Pat. No. 3,264,469 shows such a system wherein the images are moved relative to an examination station solely to accommodate for vertical misregistration. While such a system requires complicated mechanical and optical devices, it only accommodates one direction of misregistration.

An object of the present invention is to readily compensate for the misregistration in any direction between a reference image and an unknown image by the use of simple and inexpensive electronic circuitry during a cross-correlation operation.

Briefly, the invention contemplates apparatus for cross-correlating an unknown image with a reference image. Each of the images is represented by a different $n$-bit binary word wherein the value of each bit indicates the visual state of a particular cellular region of the associated image. The apparatus includes first and second $n$-stage shift registers of the ring-around type. Each of the shift registers stores one of the $n$-bit binary words. A first inequality counting means compares the output of one stage of the first shift register with the output of the corresponding stage of the second shift register and accumulates a count of the number of inequalities between the outputs of these stages during $n$ shifts of the shift registers. At least a second inequality counting means compares the output of one stage of the first shift register with the output of a noncorresponding stage of the second shift register and accumulates the number of inequalities between the outputs of the stages during $n$ shifts of the shift registers. Selection means selects the minimum of the accumulated counts to give the degree of cross-correlation.

Other objects, the features and advantages of the invention will be apparent from the following detailed description when read with the accompanying drawing which shows, by way of example, apparatus for practicing the invention.

DESCRIPTION OF THE PREFERRED EMBODIMENTS

Figures 1A, 1B, 1C, 1D, 1E:
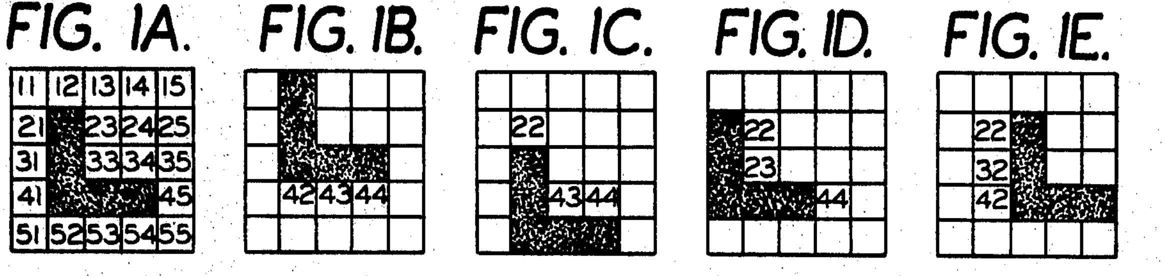
FIGS. 1A to 1E show examples of the position of an image in a cellular matrix.
Figure 2:
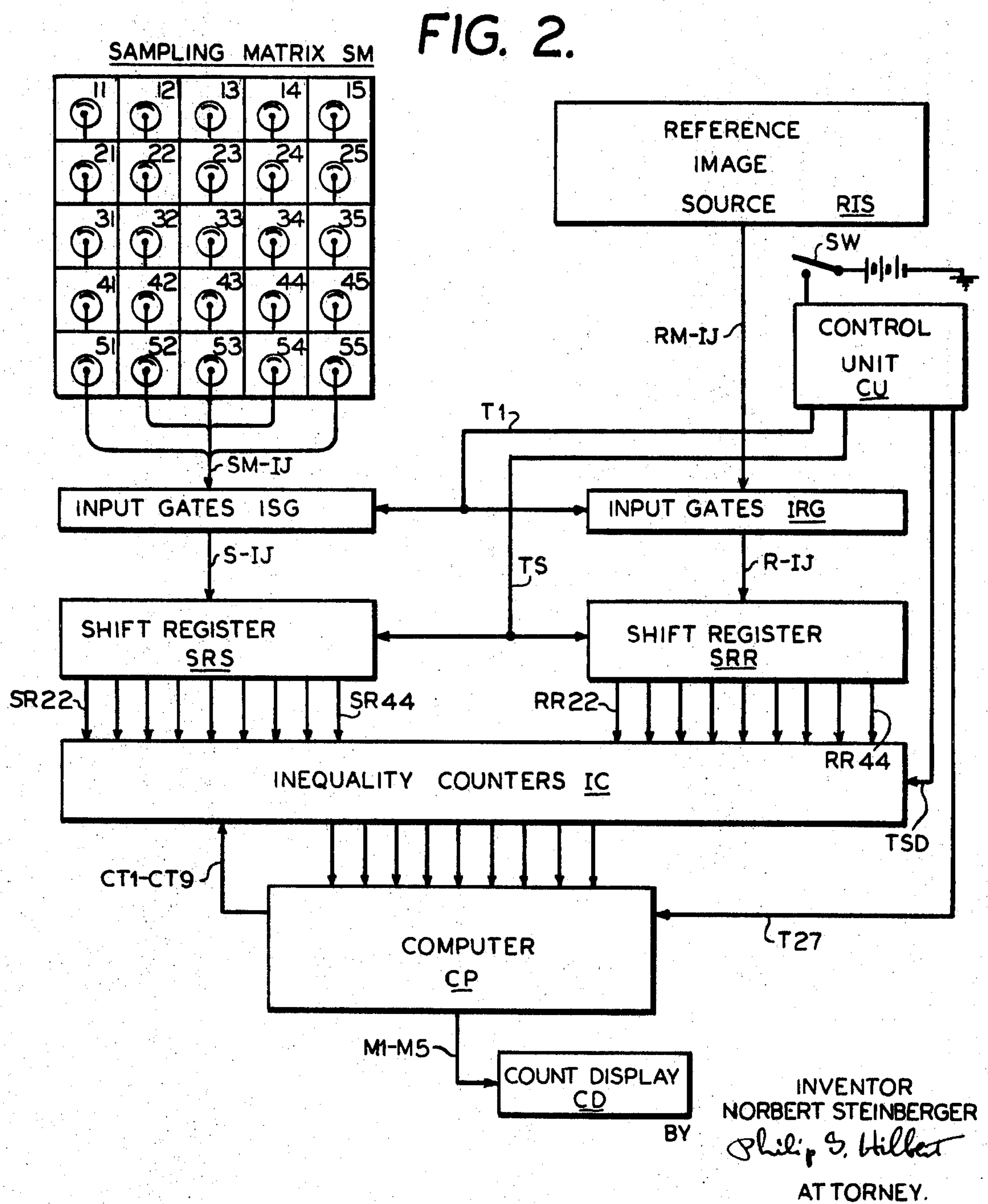
FIG. 2 shows a block diagram of a cross-correlator system embodying the invention.

The unknown image to be cross-correlated with a reference image is effectively divided into a two-dimensional grid or matrix, and the binary state, say "black" or "white" for each cell of the grid is sensed and assigned the values 1 and 0, respectively. In FIGS. 1A to 1E there are shown different orientations of an image such as the letter L on the matrix. Using conventional matrix notation it is seen that in FIG. 1A the image is centered in the matrix and occupies the cells 22, 32, 42, 43 and 44 while in FIG. 1B the image is shifted upwardly one row and occupies the cells 12, 22, 32, 33 and 34. In FIG. 1C the image is shifted downwardly one row; in FIG. 1D it is shifted to the left one column, and in FIG. 1E it is shifted to the right one column. Other orientations are also possible. (However, in each case the image is still the letter L). In any event, the unknown image is projected onto the sampling matrix SM of FIG. 2 which breaks the image into a matrix of cells and generates the signals representing the 1 and 0 according to the state of each cell. By way of example, sampling matrix SM can be a 5×5 array of photocells, each cell having an associated amplifier which transmits a signal representing a 1 if the associated cell is black. The sampling matrix can also be a flying spot scanner, driven in a faster mode, which is sampled at specified times. The actual realization of the sampling matrix SM is not important, except that it transmits a signal for each matrix cell or entry. Thus, for the example cited, it will transmit a coded combination of signals representing a 25-bit binary word when each bit position is in one-to-one correspondence with a particular cell of the matrix. The 25-bit work is carried in parallel by a 25-wire cable SM–IJ to input gates ISG.

The reference image is also represented as a 25-bit binary word of the same type and is transmitted from reference image source RIS, via cable RM–IJ, to input gates IRG. RIS can be similar to sampling matrix SM, where the images are ideal and well centered in the matrix, or can be 25-bit binary words stored in a memory, where the words represent ideal images centered in the matrix.

When the cross-correlation operation is to begin, the unknown image is "loaded" into sampling matrix SM and the reference image in reference image source RIS. Switch SW is momentarily closed energizing control unit CU which emits a sequence of 27 pulses. The first pulse is emitted on line T1, the next 25 on line TS, each after a slight delay again being emitted on line TSD, and the last pulse being emitted on line T27.

The pulse on line T1 is fed to input gates ISG and IRG. Gates ISG can be 25 two-input AND gate wherein one input to each gate is line T1 and the other input is one of the SM–IJ lines. (For example, the first gate has one input connected to line T1, the other input connected to line SM–11 associated with the cell 11 of sensing matrix SM). The output of the gate is connected to the line S–11 of the cable S–IJ. Gates IRG are similar except that they receive the signals on lines RM–IJ and have outputs connected to the lines of cable R–IJ.

Figure 3:
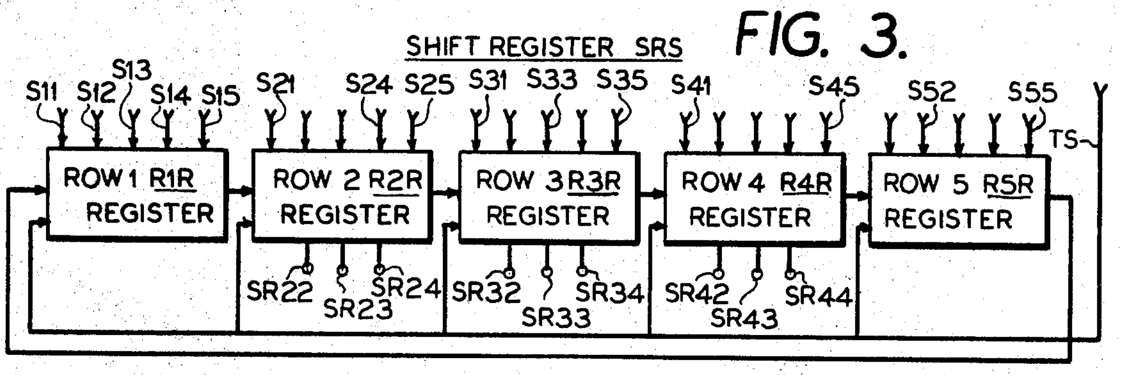
FIG. 3 is a logic diagram of one of the shift registers of the system of FIG. 2.

Each of the lines of cable S–IJ is connected to the input of a different stage of a 25-bit shift register SRS of the ring-around type, as is each of the lines of cable R–IJ for the ring-around shift register SRR. Thus, at the time T1, the binary work representing the unknown image is loaded in shift register SRS and the binary word representing the reference image is loaded into shift register SRR. The shift register SRS is shown in detail in FIG. 3 comprising five 5-bit shift registers serially connected in a closed loop. Each bit position of a row register receives a bit signal related to a cell of the associated matrix row. For example positions 1 to 5 of the row 1 register R1R receive the S11, S12, S13, S14 and S15 signals (the signals and lines carry the same designation) associated with cells 11, 12, 13, 14 and 15 of sampling matrix SM. Similarly, for the other four row registers. Each of the row registers also has a shift input connected to line TS. Each time a pulse is present on line TS (a TS pulse) the shift register shifts to the right one position. Since there is a sequence of 25 pulses on line TS and the shift register is a 25 bit ring-around shift register the stored word will be rotated around a closed loop back to its initial position at the end of the TS pulse sequence. Furthermore, if the output of any one of the bit positions of any row register is monitored, it will sequentially transmit from its output terminal all 25 bits of the stored word. As will hereinafter become apparent, the outputs of bit positions 2, 3 and 4 of row 2 register R2R, row 3 register R3R and row 4 register R4R are connected, via lines SR22, SR23, SR24, SR32, SR33, SR34, SR42, SR43 and SR44, respectively, to inequality counters IC. Shift register SRR is similar to shift register SRS except that the input signals are from lines R–IJ and the output signals are transmitted on lines R22, R23, R24, R32, R33, R34, R42, R43 and R44 to inequality counters IC.

Figure 4:
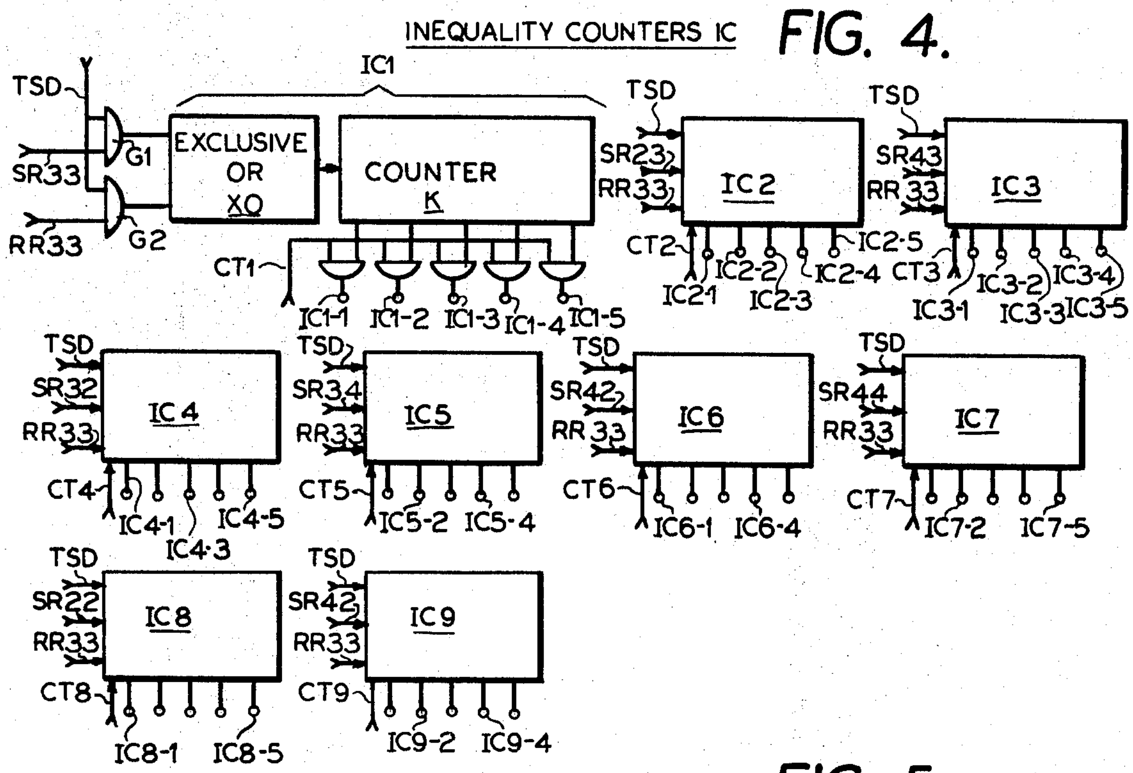
FIG. 4 is a logic diagram of the inequality counters of the system of FIG. 3.

Consider now the inequality counter IC1 of FIG. 4 which comprises AND gates G1 and G2 whose outputs are connected via an exclusive OR device XO to counter K. Device XO emits a pulse each time a pulse is present at one and only one of its inputs. Counter K is a cascaded binary counter which can count to at least 25 to count the pulses emitted by device XO. One input of each of the AND gates G1 and G2 is connected to the TSD line. The other input of AND gate G1 is connected, via line SR33, to the third element of the row 3 register of shift register SRS (FIG. 3) associated with element 33 of sampling matrix SM of FIG. 2. The other input of AND gate G2 is connected, via line RR33, to the third element of the row 3 register of shift register SRR associated with the element 33 of the reference image matrix. It should be noted that the same element position or cell of each matrix is involved in the comparison. This implies that the element 33 of sampling matrix SM "sits on top of" element 33 of the reference matrix. The comparison involves two completely aligned matrices and in particular takes into account the situation when the sampling matrix SM has the character positioned as in FIG. 1*a*, it being previously assumed that the characters in the reference matrix are always well centered.

Now, it should be recalled that there are 25 shift pulses on line TS, each of which is followed by a sampling pulse on line TSD. Thus, inequality counter IC1 performs 25 comparisons, one for each cell of the matrices as they are shifted past two "-windows," one associated with the third element of the row 3 register R3R of shift register SRS, the other with the third element of the row 3 register of shift register SRR. The counter K accumulates the number of inequalities encountered in the 25 comparisons.

Inequality counter IC2 is identical to inequality counter IC1 except that it has an input connected to line SR23 instead of line SR33. Now element 23 of sampling matrix SM "sits on top of " element 33 of the reference matrix and cross correlations between an image displaced one row up (FIG. 1B) and a centered reference image (FIG. 1A) can be performed. Similarly, inequality counters IC3 to IC9 permit cross correlations between a well centered image and one displaced one element in any vertical, horizontal or diagonal direction. Thus, in one pass, nine different inequality counts are accumulated. The least of these nine counts will be the degree of cross-correlation between the unknown image and the reference image. This least count is selected by the computer CP which is activated by the 27*th* and last pulse from control unit CU fed, via line T27, to computer CP.

Before going into the details of computer CP, its overall modus operandi will be outlined. Computer CP reads in the counts in inequality counters IC1 and IC2, performs a magnitude comparison and replaces the larger by the count in counter IC3. Another comparison is performed with the larger replaced by the count in counter IC4. After eight such comparisons the smallest count is indicated.

Figure 6:
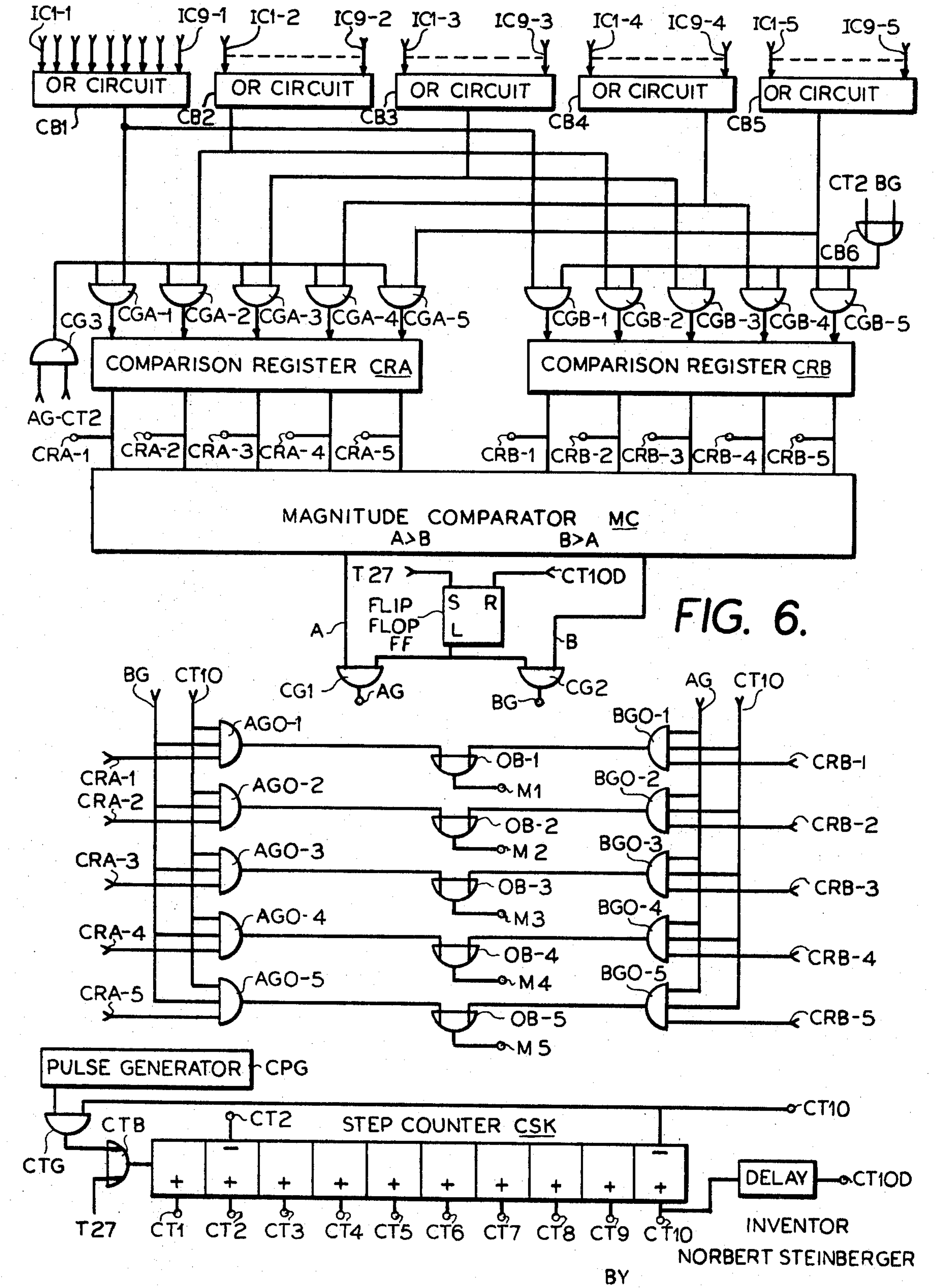
FIG. 6 is a logic diagram of the computer of the system of FIG. 3.

The computer CP, shown in FIG. 6, includes a programmer centered around a 10stage ring-type stop counter CSK which is normally locked in the tenth position by virtue of the negative output CT10 of the tenth stage inhibiting AND gate CTG. Whenever a pulse is received on line T27 it passes through OR circuit CTB to step the counter off stage 10 (ending the inhibition on line CT10) and onto stage 1. AND gate CTG now opens and stepping pulses are fed via OR circuit CTB to the step input of step counter CSK. After nine such pulses the counter is back on stage 10. However, during the stepping it emitted one pulse on each of the lines CT1 to CT9.

The logic unit of the computer CP centers around magnitude comparator MC, a parallel comparator which compares the magnitude of the contents of comparison register CRA, represented by signals on lines CRA–1 to CRA–5 with the magnitude of the contents of comparison register CRB, represented by the signals on lines CRB–1 to CRB–5. If the contents of register CRA are greater than or equal to the contents of register CRB a signal is emitted on line A. If the contents of register CRB are greater than the contents of register CRA then a signal is present on line B. The results of the comparisons are only used during the computer cycle since the set output of flip-flop FF opens AND gates CG1 and CG2 to pass the signals on lines A and B to lines AG and BG, respectively. Note flip-flop FF is set at the start of the cycle by a pulse on line T27 and cleared at the end of the cycle by a pulse of line CT10D.

At the start of the cycle, AND gates CGA–1 to CGA–5 are open because the contents of registers CRA and CRB are equal, i.e. contain nothing. Therefore a signal is present on line AG at one input of AND gate CG3 (not inhibiting signal is present at the CT2 input at that time). AND gates CGB–1 to CGB–5 are closed because no signals are present on the lines CT2 and BG at the inputs of OR circuit CB–6 whose output controls these gates.

The pulse on line CT1 is fed to inequality counter IC1 (FIG. 4) to open the AND circuits which connect the outputs of the counter stages to the lines IC1–1 to IC1–5. The signals on lines IC1–1 to IC1–5 pass, via OR circuits CB1 to CB5 and AND gates CGA–1 to CGA–5, respectively, to the five stages of register CRA. Note each of the OR circuits CB1 to CB5 receive one of the denomination positions of the inequality counters and transmits it to a pair of AND circuits each at the input of one of the stages of the registers CRA to CRB. For example, the inputs of OR circuit CB1 are connected via the lines IC1–1 to IC9–1 to the least-significant bit position of the counters IC1 to IC9, respectively. The output of OR circuit CB1 is connected, via AND gate CGA–1, to the least-significant bit position of register CRA, and, via AND gate CGB–1, to the least significant bit position of register CRB.

During the time of the pulse on line CT2, AND gate CG3 is inhibited, closing AND gates CGA–1 to CGA–5, but the signal on line CT2 passes through OR circuit CB6 opening AND gates CGB–1 to CGB–5. The signal on line CT2 is also fed to inequality counter IC2 causing its contents to pass, via lines IC2–1 to IC2–5, OR circuits CB1 to CB5, and AND circuits CGB–1 to CGB–5 to register CRB. Now, at the end of CT2 time, the contents of inequality counter IC1 is in register CRA, the contents of the counter IC2 is in register CRB, and the magnitude comparison MC is performed to yield a signal on either line AG or BG. When the CT3 pulse is generated the contents of inequality counter IC3 are loaded into register CRA, replacing its previous contents, if the AG signal is present, or into register CRB, replacing its previous contents, if the BG signal is present.

At CT10 time the last comparison has been made and either the AG or BG signal is present. If the BG signal is present, the contents of register CRA represent the least value which will be made available in the following manner. The simultaneous presence of the signals on lines BG and CT10 open AND gates AG0–1 to AG0–5 connecting the outputs of comparison register CRA, via lines CRA–1 to CRA–5, AND gates AG0–1 to AG0–5 and OR circuits OB–1 to OB–5 to lines M1 to M5. If the contents of register CRB are the least, the presence of signals on lines AG and CT10 open AND gates BG0–1 to BG0–5 and the contents of register CRB is fed, via lines CRB–1 to CRB–5, AND gates BG0–1 to BG0–5, and OR circuits OB–1 to OB–5 to lines M1 to M5 which are connected to count display CD (FIG. 1). Thereafter, a pulse on line CT10D from step counter CSK clears flip-flop FF ending the cycle.

Figure 5:
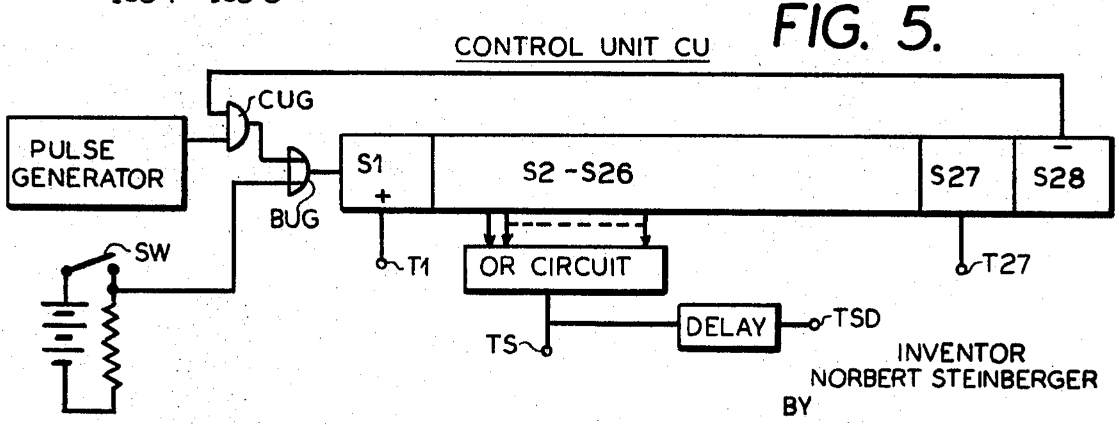
FIG. 5 is a logic diagram of the control unit of the system of FIG. 3.

The control unit CU (FIG. 5) comprises a 28 stage step counter, similar in operation, to step counter CSK of FIG. 6. The only difference is how the outputs are used. The positive output of the first stage S1 is connected to line T1, the positive outputs of stages S2 to S26 are connected via an OR circuit to line TS (line TS is connected by a fraction of a pulse time delay to line TSD), the positive output of stage S27 is connected to line T27, and the negative output of stage S28 is connected as an inhibiting input to AND gate CUG. The other input of AND gate CUG is connected to a pulse generator. The output of and circuit CUG is connected to one input of OR circuit BUG whose other input is connected to switch SW. The output of the OR circuit BUG is connected to the step input of the counter.

There has thus been shown improved apparatus for performing cross-correlations of images of patterns such as alphanumerics. It should be realized that other patterns can be so cross-correlated and that the 5×5 matrix was used as an example. Generally higher order matrices will be employed.

As far as the actual circuitry is concerned, only representative devices were disclosed. Other devices could be used. For example, a 25bit shift register could be used instead of five 5-bit shift registers connected in cascade. Again although positive and/or logic was used other logic such as NAND/NOR logic is equally applicable. Furthermore, it should be realized that only basic logical units have been shown whereas good engineering practice would require amplification devices to handle some fanout conditions, and any devices such as registers would require initial clearing signals. However, such techniques are obvious to those skilled in the art and have not been included for the sake of conciseness.

Typical logic elements are well known and can be the modules and units shown and described.

I claim:

1. Apparatus for cross-correlating an unknown image with a reference image, each image being represented by a different $n$-bit binary word, wherein the value of each bit is an indication of the visual state of a particular cellular region of the associated image, said apparatus comprising first and second $n$-stage shift registers of the ring-around type for storing the binary words representing the reference and unknown images, respectively, means for causing said shift registers to perform at least $n$ shifts, first inequality counting means for comparing the output of one stage of said first shift register with the output of the corresponding stage of said second shift register and accumulating a count of the number of inequalities between the outputs of said stages during $n$ shifts of said shift registers, at least a second inequality counting means for comparing the output of one stage of said first shift register with the output of a noncorresponding stage of said second shift register and accumulating a count of the number of inequalities between the outputs of said stages during $n$ shifts of said shift registers, and means for selecting the minimum of the accumulated counts.

2. The apparatus of claim 1 wherein the one stage of said first shift register is the same for each of said inequality counting means.

3. The apparatus of claim 1 wherein said inequality counting means perform the comparing and accumulating during the same $n$ shifts of said shift registers.

4. The apparatus of claim 1 wherein the one stage of said first shift register is the same for each of said inequality counting means and said inequality counting means perform the comparing and accumulating during the same $n$ shifts of said registers.

5. The apparatus of claim 1 wherein each of said images is divided into a matrix array of cellular regions arranged in rows and columns and each stage of each of said shift registers is associated with a different particular cellular region respectively, said first inequality counting means comparing the output of a reference stage of one of said shift registers associated with a first particular cellular region defined by a particular row and a particular column of the associated matrix with the output of the stage of the other of said shift registers associated with a second particular cellular region defined by said particular row and said particular column of the associated matrix, and said second inequality counting means comparing the output of said reference stage of said one shift register with a stage of said second shift register associated with a third particular cellular region abutting said second particular cellular region.

6. The apparatus of claim 5 further comprising a third inequality counting means for comparing the output of said reference stage of said first shift register with a fourth particular cellular region abutting said second particular cellular region.

7. The apparatus of claim 6 wherein said third and fourth particular cellular regions are in the same column of the associated matrix.

8. The apparatus of claim 6 wherein said third and fourth particular cellular regions are in the same row of the associated matrix.

9. The apparatus of claim 8 and further comprising seven further inequality counting means, each of said further inequality counting means comparing the output of said reference stage of said first shift register with a different cellular region which is different from said third particular cellular region but abutting said second particular cellular region.

10. The apparatus of claim 9 wherein said second particular cellular region has the same particular column and row designation as said first particular region.